United States Patent
Hu et al.

(10) Patent No.: US 11,564,135 B2
(45) Date of Patent: Jan. 24, 2023

(54) METHOD OF SENDING CELL INFORMATION, CELL CAMPING METHOD, NETWORK DEVICE AND TERMINAL

(71) Applicants: China Mobile Communication Co., Ltd Research Institute, Beijing (CN); China Mobile Communications Group Co., Ltd., Beijing (CN)

(72) Inventors: Nan Hu, Beijing (CN); Xiaodong Xu, Beijing (CN); Guangyi Liu, Beijing (CN); Yuhong Huang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 16/650,714

(22) PCT Filed: Sep. 21, 2018

(86) PCT No.: PCT/CN2018/106962
§ 371 (c)(1),
(2) Date: Mar. 25, 2020

(87) PCT Pub. No.: WO2019/062664
PCT Pub. Date: Apr. 4, 2019

(65) Prior Publication Data
US 2020/0288358 A1    Sep. 10, 2020

(30) Foreign Application Priority Data

Sep. 27, 2017    (CN) .................. 201710891560.4

(51) Int. Cl.
*H04W 36/00* (2009.01)
*H04W 48/08* (2009.01)
*H04W 48/16* (2009.01)

(52) U.S. Cl.
CPC ....... *H04W 36/0072* (2013.01); *H04W 48/08* (2013.01); *H04W 48/16* (2013.01)

(58) Field of Classification Search
None
See application file for complete search history.

(56) References Cited

U.S. PATENT DOCUMENTS

| 8,787,912 | B2 | 7/2014 | Zou |
| 9,374,773 | B2 * | 6/2016 | Cui ...................... H04W 48/18 |

(Continued)

FOREIGN PATENT DOCUMENTS

| CN | 105007606 A | 10/2015 |
| CN | 105519188 A | 4/2016 |

*Primary Examiner* — German Viana Di Prisco
(74) *Attorney, Agent, or Firm* — Price Heneveld LLP

(57) ABSTRACT

A method of sending cell information, a cell camping method, a network device and a terminal are provided. The method of sending cell information includes: sending system information of a first cell to a terminal. The cell camping method includes: receiving system information of a first cell sent by the first cell, where the system information includes at least two camping thresholds of the first cell, or one camping threshold and at least two threshold offsets of the first cell; the at least two camping thresholds respectively correspond to terminals with different uplink resource access capabilities, and the at least two threshold offsets respectively correspond to terminals with different uplink resource access capabilities.

17 Claims, 3 Drawing Sheets

(56) References Cited

U.S. PATENT DOCUMENTS

| | | | |
|---|---|---|---|
| 2016/0029276 A1* | 1/2016 | Ye | H04W 48/02 455/436 |
| 2016/0205692 A1* | 7/2016 | Zhang | H04W 56/001 370/329 |
| 2017/0070931 A1 | 3/2017 | Huang et al. | |
| 2017/0094571 A1* | 3/2017 | Yu | H04W 36/08 |
| 2018/0063735 A1* | 3/2018 | Raghunathan | H04W 24/08 |
| 2019/0053129 A1* | 2/2019 | Kim | H04W 74/0833 |
| 2020/0280913 A1* | 9/2020 | Chen | H04W 48/12 |

\* cited by examiner

METHOD OF SENDING CELL INFORMATION, CELL CAMPING METHOD, NETWORK DEVICE AND TERMINAL

CROSS REFERENCE OF RELATED APPLICATION

The present disclosure is the U.S. national phase of PCT Application PCT/CN2018/106962 filed on Sep. 21, 2018, which claims a priority of Chinese patent application No. 201710891560.4 filed on Sep. 27, 2017, which is incorporated herein by reference in its entirety.

TECHNICAL FIELD

The present disclosure relates to the field of communication technologies, and in particular, to a method of sending cell information, a cell camping method, a network device and a terminal.

BACKGROUND

In the cellular technology in the related art, any cell corresponds to only one uplink carrier resource, that is, a terminal in an idle state may only use the resource of one uplink carrier (or an uplink slot of one carrier) to perform an uplink initial access. After the Supplementary uplink (SUL) technology is introduced, the terminal may use resources on any one of multiple uplink carriers (or uplink slots of multiple carriers) to perform an uplink initial access.

After the SUL is introduced, if the cell supports SUL, then the terminal supporting the SUL may have more options to perform the uplink access. Compared with the terminal that does not support SUL, the terminal supporting the SUL has a different uplink access capability.

Most intuitively, if a cell uses two frequency resources with different uplink coverage as optional uplink access resources, then terminals in the same geographical area may only initiate uplink access on uplink resources with poor uplink coverage, so it may not be able to access this cell, and a terminal that supports initial access on both uplink resources with poor coverage and uplink resources with good coverage may access this cell. In other words, different types of terminals are in this geographic area. some terminals should perform a cell reselection and choose other cells to camp on, and some terminals should camp on this cell.

SUMMARY

A method of sending cell information, a cell camping method, a network device and a terminal are provided in the embodiments of the present disclosure. When 5G supports the UE in the Idle state to access on multiple uplink resources, different terminal capabilities and different cell uplink resources are taken into consideration of the evaluation of cell selection and reselection, so that the terminals with different uplink resource access capabilities may camp on the most suitable cell based on the uplink resource access capabilities thereof.

In view of this, the embodiments of the present disclosure are as follows.

A method of sending cell information is provided in an embodiment of the present disclosure, including:

sending system information of a first cell to a terminal, where the system information includes at least two camping thresholds of the first cell, or one camping threshold and at least two threshold offsets of the first cell;

the at least two camping thresholds respectively correspond to terminals with different uplink resource access capabilities, and the at least two threshold offsets respectively correspond to terminals with different uplink resource access capabilities.

Optionally, the sending the system information of the first cell to the terminal includes:

sending, by the first cell supporting a supplementary uplink resource technology, the system information of the first cell to the terminal.

Optionally, the system information further includes: at least two camping thresholds of a second cell, or one camping threshold and at least two threshold offsets of the second cell;

the second cell is a neighboring cell of the first cell;

the at least two camping thresholds of the second cell respectively correspond to terminals with different uplink resource access capabilities, and the at least two threshold offsets of the second cell respectively correspond to terminals with different uplink resource access capabilities.

A network device is further provided in an embodiment of the present disclosure, including: a transceiver configured to send system information of a first cell to a terminal, where the system information includes at least two camping thresholds of the first cell, or one camping threshold and at least two threshold offsets of the first cell;

the at least two camping thresholds respectively correspond to terminals with different uplink resource access capabilities, and the at least two threshold offsets respectively correspond to terminals with different uplink resource access capabilities.

Optionally, the system information further includes: at least two camping thresholds of a second cell, or one camping threshold and at least two threshold offsets of the second cell;

the second cell is a neighboring cell of the first cell;

the at least two camping thresholds of the second cell respectively correspond to terminals with different uplink resource access capabilities, and the at least two threshold offsets of the second cell respectively correspond to terminals with different uplink resource access capabilities.

A cell camping method is further provided in an embodiment of the present disclosure, including:

receiving system information of a first cell sent by the first cell, where the system information includes at least two camping thresholds of the first cell, or one camping threshold and at least two threshold offsets of the first cell;

the at least two camping thresholds respectively correspond to terminals with different uplink resource access capabilities, and the at least two threshold offsets respectively correspond to terminals with different uplink resource access capabilities.

Optionally, the receiving the system information of the first cell sent by the first cell includes:

receiving the system information sent by the first cell supporting an uplink supplementary resource technology.

Optionally, the cell camping method further includes:

selecting, based on the uplink resource access capability of the terminal, the camping threshold corresponding to the uplink resource access capability of the terminal from the at least two camping thresholds;

accessing and camping on the first cell, based on an uplink resource corresponding to the camping threshold.

Optionally, the cell camping method further includes:

calculating at least two camping threshold values respectively based on the one camping threshold and the at least two threshold offsets;

selecting, based on the uplink resource access capability of the terminal, the camping threshold corresponding to the uplink resource access capability of the terminal from the at least two calculated camping threshold values; and accessing and camping on the first cell, based on an uplink resource corresponding to the camping threshold corresponding to the uplink resource access capability of the terminal.

Optionally, the system information further includes: at least two camping thresholds of a second cell, or one camping threshold and at least two threshold offsets of the second cell;

the second cell is a neighboring cell of the first cell;

the at least two camping thresholds of the second cell respectively correspond to terminals with different uplink resource access capabilities, and the at least two threshold offsets of the second cell respectively correspond to terminals with different uplink resource access capabilities.

Optionally, in the case that the terminal performs a cell reselection, the method further includes:

determining whether the second cell is to serve as a candidate cell for the cell reselection of the terminal, based on the uplink resource access capability of the terminal and the at least two camping thresholds of the second cell;

selecting the camping threshold corresponding to the uplink resource access capability of the terminal from the at least two camping thresholds of the second cell, in case of determining that the second cell is to serve as the candidate cell for the cell reselection of the terminal; and accessing the second cell, based on an uplink resource corresponding to the camping threshold.

Optionally, in the case that the terminal performs a cell reselection, the method further includes:

calculating at least two camping threshold values of the second cell respectively, based on the one camping threshold and the at least two threshold offsets of the second cell;

determining whether the second cell is to serve as a candidate cell for the cell reselection of the terminal, based on the uplink resource access capability of the terminal and the at least two calculated camping threshold values of the second cell;

selecting the camping threshold corresponding to the uplink resource access capability of the terminal from the at least two camping threshold values of the second cell, in case of determining that the second cell is to serve as the candidate cell for the cell reselection of the terminal; and accessing the second cell, based on an uplink resource corresponding to the camping threshold.

A terminal is further provided in an embodiment of the present disclosure, including: a transceiver configured to receive system information of a first cell sent by the first cell, where the system information includes at least two camping thresholds of the first cell, or one camping threshold and at least two threshold offsets of the first cell;

the at least two camping thresholds respectively correspond to terminals with different uplink resource access capabilities, and the at least two threshold offsets respectively correspond to terminals with different uplink resource access capabilities.

Optionally, the transceiver is further configured to receive the system information sent by the first cell supporting an uplink supplementary resource technology.

Optionally, the terminal further includes a first processor configured to:

select, based on the uplink resource access capability of the terminal, the camping threshold corresponding to the uplink resource access capability of the terminal from the at least two camping thresholds;

access and camp on the first cell, based on an uplink resource corresponding to the camping threshold.

Optionally, the terminal further includes a second processor configured to:

calculate at least two camping threshold values respectively based on the one camping threshold and the at least two threshold offsets;

select, based on the uplink resource access capability of the terminal, the camping threshold corresponding to the uplink resource access capability of the terminal from the at least two calculated camping threshold values; and access and camp on the first cell, based on an uplink resource corresponding to the camping threshold corresponding to the uplink resource access capability of the terminal.

Optionally, the system information further includes: at least two camping thresholds of a second cell, or one camping threshold and at least two threshold offsets of the second cell;

the second cell is a neighboring cell of the first cell;

the at least two camping thresholds of the second cell respectively correspond to terminals with different uplink resource access capabilities, and the at least two threshold offsets of the second cell respectively correspond to terminals with different uplink resource access capabilities.

Optionally, in the case that the terminal performs a cell reselection, the terminal further includes a third processor configured to:

determine whether the second cell is to serve as a candidate cell for the cell reselection of the terminal, based on the uplink resource access capability of the terminal and the at least two camping thresholds of the second cell;

select the camping threshold corresponding to the uplink resource access capability of the terminal from the at least two camping thresholds of the second cell, in case of determining that the second cell is to serve as the candidate cell for the cell reselection of the terminal; and access the second cell, based on an uplink resource corresponding to the camping threshold.

Optionally, in the case that the terminal performs a cell reselection, the terminal further includes a fourth processor configured to:

calculate at least two camping threshold values of the second cell respectively, based on the one camping threshold and the at least two threshold offsets of the second cell;

determine whether the second cell is to serve as a candidate cell for the cell reselection of the terminal, based on the uplink resource access capability of the terminal and the at least two calculated camping threshold values of the second cell;

select the camping threshold corresponding to the uplink resource access capability of the terminal from the at least two camping threshold values of the second cell, in case of determining that the second cell is to serve as the candidate cell for the cell reselection of the terminal; and access the second cell, based on an uplink resource corresponding to the camping threshold.

A communication device is further provided in an embodiment of the present disclosure, including a processor and a memory storing a computer program, where the computer program is executed by the processor to perform the method of sending cell information hereinabove or the cell camping method hereinabove.

A computer-readable storage medium is further provided in an embodiment of the present disclosure, including an instruction, where the instruction runs on a computer to enable the computer to perform the method of sending cell information hereinabove or the cell camping method hereinabove.

According to the embodiments of the present disclosure, system information of a first cell is sent to a terminal, where the system information includes at least two camping thresholds of the first cell, or one camping threshold and at least two threshold offsets of the first cell, the at least two camping thresholds respectively correspond to terminals with different uplink resource access capabilities, and the at least two threshold offsets respectively correspond to terminals with different uplink resource access capabilities. Therefore, the terminal may select or determine the corresponding cell camping threshold based on its support capability for the SUL technology (i.e., the uplink resource access capability) and camp on a cell based on the selected or determined cell camping threshold, so that the terminals with different uplink resource access capabilities may camp on the most suitable cell based on the uplink resource access capabilities thereof.

DETAILED DESCRIPTION

Figure 1:
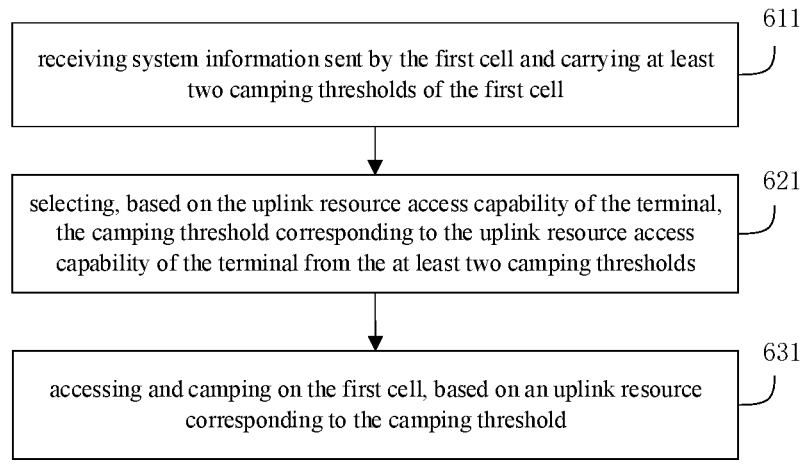
FIG. 1 is a flowchart of a cell camping method in the present disclosure.

Hereinafter, the embodiments of the present disclosure will be described in more detail with reference to the drawings. Although the embodiments of the present disclosure are shown in the drawings, it should be understood that the present disclosure may be implemented in various forms and should not be limited by the embodiments herein. On the contrary, these embodiments are provided to enable a thorough understanding of the present disclosure, and to fully convey the scope of the present disclosure to those skilled in the art.

A method of sending cell camping information is provided in a first embodiment of the present disclosure, including:

sending system information of a first cell to a terminal, where the system information includes at least two camping thresholds of the first cell, or one camping threshold and at least two threshold offsets of the first cell; the at least two camping thresholds respectively correspond to terminals with different uplink resource access capabilities, and the at least two threshold offsets respectively correspond to terminals with different uplink resource access capabilities.

In the embodiment of the present disclosure, the first cell that supports the uplink supplementary resource (SUL) technology may send system information carrying at least two camping thresholds of the first cell to the terminal, or the first cell that supports the SUL technology may send system information carrying one camping threshold and at least two threshold offsets of the first cell to the terminal.

In the embodiment of the present disclosure, the system information carrying at least two camping thresholds of the first cell or one camping threshold and at least two threshold offsets of the first cell are sent to the terminal through broadcasting.

In the embodiment of the present disclosure, the first cell that supports the SUL technology may send system information carrying at least two camping thresholds of the first cell to the terminal, or may send system information carrying one camping threshold and at least two threshold offsets of the first cell to the terminal, through broadcasting.

According to the embodiments of the present disclosure, the system information of the first cell is sent to the terminal, so that the terminal may receive the system information sent by the first cell. The at least two camping thresholds correspond to terminals with different uplink resource access capabilities, thereby further enabling the terminal to select or determine the corresponding cell camping threshold based on its support capability for SUL technology (i.e., the uplink resource access capability) and camp on a cell based on the selected or determined cell camping threshold, so that the terminals with different uplink resource access capabilities may camp on the most suitable cell based on the uplink resource access capabilities thereof.

In the above embodiment of the present disclosure, in the case that the system information carrying at least two camping thresholds of the first cell is sent to the terminal, if the first cell supports the SUL technology, the camping threshold information of the first cell is added to the system information broadcast. The camping threshold information of the first cell includes: at least two camping thresholds, e.g., the broadcast camping threshold Sthreshold which is applicable to a certain type of terminal. The camping threshold values need to be in a one-to-one correspondence to different types of terminals (i.e., different uplink resource access capabilities, where uplink resources may be uplink carriers), and different types of terminals refer to terminals be able to support different uplink resource capabilities.

For example, the serving cell A (the first cell) supports the terminal to use f1 carrier for uplink access and supports the terminal to use f2 carrier for uplink access, so there may be three types of terminals.

Terminal type 1 only supports using f1 carrier for uplink access, terminal type 2 only supports using f2 carrier for uplink access, and terminal type 3 supports using both f1 carrier and f2 carrier for uplink access.

In the embodiment of the present disclosure, in the case that the system information carrying one camping threshold and at least two threshold offsets of the first cell is sent to the terminal, for example, a camping threshold Sthreshold and an offset value (threshold offset value) are broadcasted, then the terminal may obtain the corresponding threshold by means of Sthreshold+offset.

A method of sending cell camping information is provided in an embodiment of the present disclosure, including:

sending system information of a first cell to a terminal, where the system information includes at least two camping thresholds of the first cell, or one camping threshold and at least two threshold offsets of the first cell; the at least two camping thresholds respectively correspond to terminals with different uplink resource access capabilities.

The system information may further include at least two camping thresholds of a second cell, the second cell is a neighbor cell of the first cell, the at least two camping thresholds of the second cell respectively correspond to terminals with different uplink resource access capabilities. If the neighboring cell (second cell) of the first cell supports the SUL technology, the camping threshold information of this neighboring cell is added to the system information broadcast of the first cell, where the camping threshold information of the neighbor cell includes: at least two camping thresholds of the neighbor cell, e.g., the broadcast camping threshold Sthreshold which is applicable to a certain type of terminal. The thresholds need to be in a one-to-one correspondence to different types of terminals, and different types of terminals refer to terminals be able to support different uplink resource capabilities.

The system information may further include: one camping threshold and at least two threshold offsets of the second cell, the second cell is a neighbor cell of the first cell, and at least two threshold offsets of the second cell correspond to terminals with different uplink resource access capabilities respectively, then the terminal may obtain the corresponding threshold by means of Sthreshold+offset, where Sthreshold is a camping threshold and offset is the threshold offset.

A network side device is further provided in an embodiment of the present disclosure, including:

a transceiver configured to send system information of a first cell to a terminal, where the system information includes at least two camping thresholds of the first cell, or one camping threshold and at least two threshold offsets of the first cell; the at least two camping thresholds respectively correspond to terminals with different uplink resource access capabilities, and the at least two threshold offsets respectively correspond to terminals with different uplink resource access capabilities.

The transceiver is specifically configured to send the system information carrying the first cell to the terminal in a broadcast manner.

The system information further includes: at least two camping thresholds of a second cell, or one camping threshold and at least two threshold offsets of the second cell; the second cell is a neighboring cell of the first cell; the at least two camping thresholds of the second cell respectively correspond to terminals with different uplink resource access capabilities, and the at least two threshold offsets of the second cell respectively correspond to terminals with different uplink resource access capabilities.

It should be noted that the embodiment of the network device is a device embodiment corresponding to the foregoing method. All implementation manners in the foregoing method embodiment are applicable to the fourth embodiment, and the same technical effect may also be achieved.

A cell camping method is further provided in an embodiment of the present disclosure, including:

receiving system information of a first cell sent by the first cell, where the system information includes at least two camping thresholds of the first cell, or one camping threshold and at least two threshold offsets of the first cell; the at least two camping thresholds respectively correspond to terminals with different uplink resource access capabilities, and the at least two threshold offsets respectively correspond to terminals with different uplink resource access capabilities.

Specifically, the system information sent by the first cell supporting the SUL technology is received; or the system information of the first cell sent by the first cell through broadcasting is received; or the system information of the first cell sent by the first cell supporting the SUL technology is received in a broadcast manner.

According to the embodiments of the present disclosure, the system information of the first cell is received by the terminal, the at least two camping thresholds correspond to terminals with different uplink resource access capabilities, thereby enabling the terminal to select or determine the corresponding cell camping threshold based on its support capability for SUL technology (i.e., the uplink resource access capability) and camp on a cell based on the selected or determined cell camping threshold, so that the terminals with different uplink resource access capabilities may camp on the most suitable cell based on the uplink resource access capabilities thereof.

Specifically, as shown in FIG. 1, a cell camping method is provided in the foregoing embodiment of the present disclosure, including:

Step 611: receiving system information sent by the first cell and carrying at least two camping thresholds of the first cell, where the at least two camping thresholds respectively correspond to terminals with different uplink resource access capabilities;

Step 621: selecting, based on the uplink resource access capability of the terminal, the camping threshold corresponding to the uplink resource access capability of the terminal from the at least two camping thresholds; and Step 631: accessing and camping on the first cell, based on an uplink resource corresponding to the camping threshold.

In this embodiment, the terminal acquires the camping threshold in the broadcasted system information, and selects an appropriate camping threshold according to its uplink resource access capability and the correspondence between the camping thresholds and different types of terminals, thereby accessing and camping on the first cell based on an uplink resource corresponding to the selected camping threshold.

Figure 2:
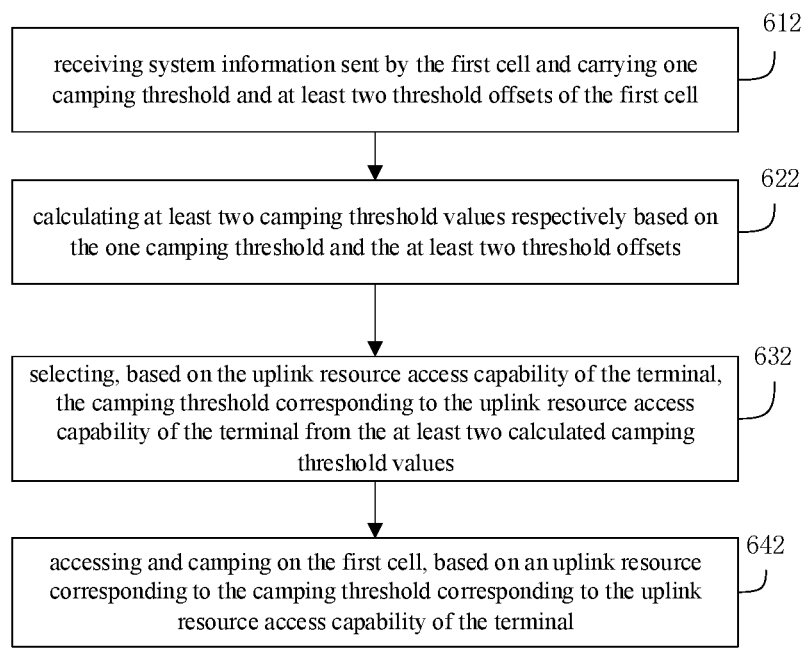
FIG. 2 is another flowchart of a cell camping method in the present disclosure.

As shown in FIG. 2, a cell camping method is provided in the foregoing embodiment of the present disclosure, including:

Step 612: receiving system information sent by the first cell and carrying one camping threshold and at least two threshold offsets of the first cell;

Step 622: calculating at least two camping threshold values respectively based on the one camping threshold and the at least two threshold offsets, where the at least two threshold offsets respectively correspond to terminals with different uplink resource access capabilities;

Step 632: selecting, based on the uplink resource access capability of the terminal, the camping threshold corresponding to the uplink resource access capability of the terminal from the at least two calculated camping threshold values;

Specifically, the terminal compares the measurement result obtained by measuring its own uplink resource access capability with the calculated at least two camping thresholds respectively. When a certain condition is meet, the terminal considers that the first cell can be camped on, otherwise it considers that the first cell cannot be camped on. For example, when the "measurement result obtained by measuring its uplink resource access capability" is greater than the "camping threshold+threshold offset", the terminal considers that the first cell may be camped on.

Step 642: accessing and camping on the first cell, based on an uplink resource corresponding to the camping threshold corresponding to the uplink resource access capability of the terminal.

In this embodiment, the terminal obtains the absolute camping threshold and threshold offset in the broadcasted system information and calculates the camping threshold, and selects an appropriate camping threshold based on its uplink resource access capability, thereby accessing and camping on the first cell based on uplink resources corresponding to the selected camping threshold.

Figure 3:
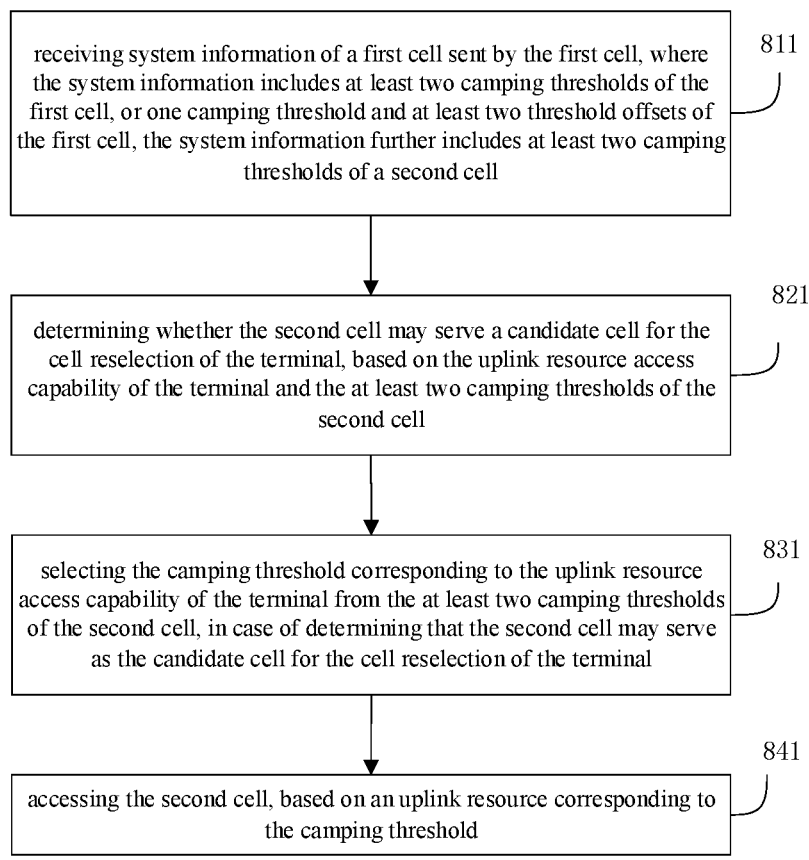
FIG. 3 is another flowchart of a cell camping method in the present disclosure.

As shown in FIG. 3, a cell camping method is provide in an embodiment of the present disclosure provides, including:

Step 811: receiving system information of a first cell sent by the first cell, where the system information includes at least two camping thresholds of the first cell, or one camping threshold and at least two threshold offsets of the first cell; the at least two camping thresholds respectively correspond to terminals with different uplink resource access capabilities, and the at least two threshold offsets respectively correspond to terminals with different uplink resource access capabilities;

the system information further includes: at least two camping thresholds of a second cell, the second cell is a neighboring cell of the first cell; the at least two camping thresholds of the second cell respectively correspond to terminals with different uplink resource access capabilities;

Step 821: determining whether the second cell may serve a candidate cell for the cell reselection of the terminal, based on the uplink resource access capability of the terminal and the at least two camping thresholds of the second cell;

Step 831: selecting the camping threshold corresponding to the uplink resource access capability of the terminal from the at least two camping thresholds of the second cell, in case of determining that the second cell may serve as the candidate cell for the cell reselection of the terminal;

Step 841: accessing the second cell, based on an uplink resource corresponding to the camping threshold.

In this embodiment of the present disclosure, when the terminal decides to try to reselect a new cell, it first needs to determine whether the new cell belongs to a reselection candidate cell. The specific determination method is: if the threshold information of new cell is broadcasted in the current cell, the terminal obtains the camping threshold information about the new cell (second cell) in the broadcast message, and selects a suitable threshold value according to its uplink resource access capability, and the correspondence between these camping thresholds and different types of terminals, so as to access the second cell according to the uplink resource corresponding to the selected camping threshold.

Figure 4:
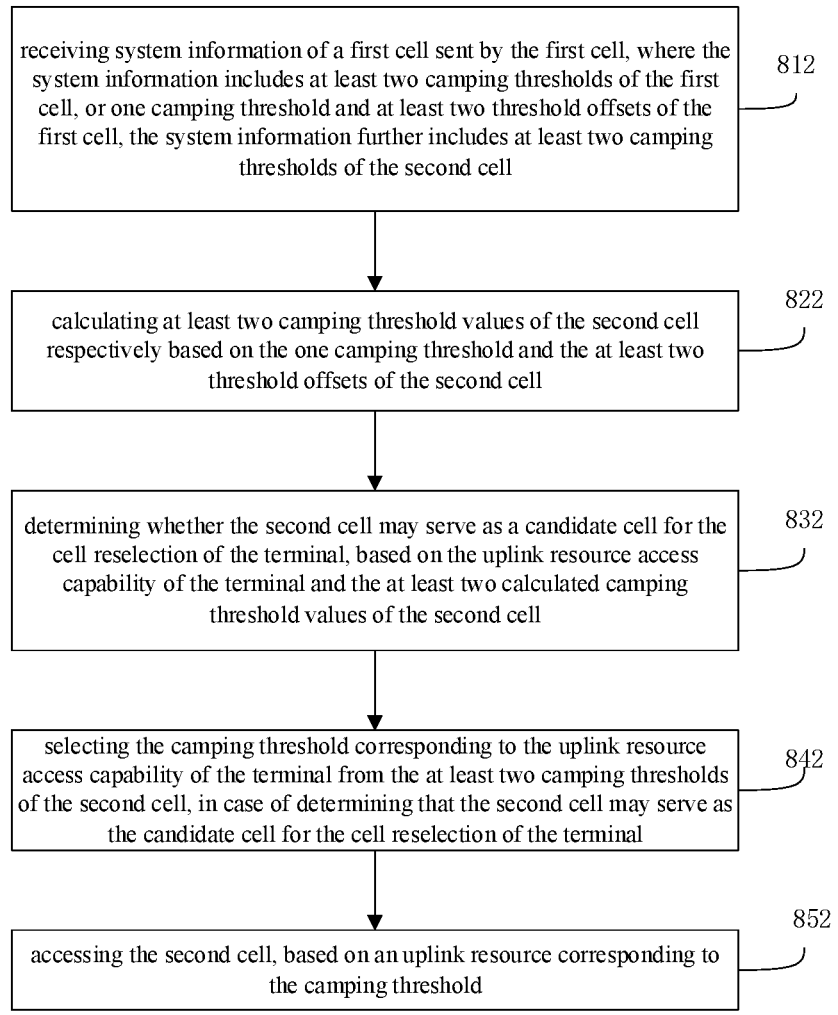
FIG. 4 is another flowchart of a cell camping method in the present disclosure.

As shown in FIG. 4, a cell camping method is further provided in an embodiment of the present disclosure, including:

Step 812: receiving system information of a first cell sent by the first cell, where the system information includes at least two camping thresholds of the first cell, or one camping threshold and at least two threshold offsets of the first cell; the at least two camping thresholds respectively correspond to terminals with different uplink resource access capabilities, and the at least two threshold offsets respectively correspond to terminals with different uplink resource access capabilities.

The system information further includes: one camping threshold and at least two threshold offsets; the second cell is a neighboring cell of the first cell; the at least two camping thresholds of the second cell respectively correspond to terminals with different uplink resource access capabilities, and the at least two threshold offsets of the second cell respectively correspond to terminals with different uplink resource access capabilities.

Step 822: calculating at least two camping threshold values of the second cell respectively based on the one camping threshold and the at least two threshold offsets of the second cell;

Step 832: determining whether the second cell may serve as a candidate cell for the cell reselection of the terminal, based on the uplink resource access capability of the terminal and the at least two calculated camping threshold values of the second cell;

Step 842: selecting the camping threshold corresponding to the uplink resource access capability of the terminal from the at least two camping thresholds of the second cell, in case of determining that the second cell may serve as the candidate cell for the cell reselection of the terminal;

Step 852: accessing the second cell, based on an uplink resource corresponding to the camping threshold.

In the embodiment of the present disclosure, the terminal compares the measurement result obtained by measuring its own uplink resource access capability with the camping threshold value. When a certain condition is meet, the terminal considers that the new cell can be a reselection candidate cell, otherwise the terminal considers that the new cell cannot be camped on. For example, when the "value of measurement result of the uplink resource access capability of the terminal" is greater than the "camping threshold+ threshold offset", the terminal considers that the second cell can be a reselection candidate cell and may further reselect and access the second cell.

A terminal is provided in an embodiment of the present disclosure, including:

a transceiver configured to receive system information of a first cell sent by the first cell, where the system information includes at least two camping thresholds of the first cell, or one camping threshold and at least two threshold offsets of the first cell;

the at least two camping thresholds respectively correspond to terminals with different uplink resource access capabilities, and the at least two threshold offsets respectively correspond to terminals with different uplink resource access capabilities.

Optionally, the transceiver is further configured to receive the system information sent by the first cell supporting an uplink supplementary resource technology, or receive the system information sent by the first cell through broadcasting.

Optionally, the terminal further includes a first processor configured to:

select, based on the uplink resource access capability of the terminal, the camping threshold corresponding to the uplink resource access capability of the terminal from the at least two camping thresholds;

access and camp on the first cell, based on an uplink resource corresponding to the camping threshold.

Optionally, the terminal further includes a second processor configured to:

calculate at least two camping threshold values respectively based on the one camping threshold and the at least two threshold offsets;

select, based on the uplink resource access capability of the terminal, the camping threshold corresponding to the uplink resource access capability of the terminal from the at least two calculated camping threshold values; and access and camp on the first cell, based on an uplink resource corresponding to the camping threshold corresponding to the uplink resource access capability of the terminal.

Optionally, the system information further includes: at least two camping thresholds of a second cell, or one camping threshold and at least two threshold offsets of the second cell;

the second cell is a neighboring cell of the first cell;

the at least two camping thresholds of the second cell respectively correspond to terminals with different uplink resource access capabilities, and the at least two threshold offsets of the second cell respectively correspond to terminals with different uplink resource access capabilities.

Optionally, in the case that the terminal performs a cell reselection, the terminal further includes a third processor configured to:

determine whether the second cell is to serve as a candidate cell for the cell reselection of the terminal, based on the uplink resource access capability of the terminal and the at least two camping thresholds of the second cell;

select the camping threshold corresponding to the uplink resource access capability of the terminal from the at least two camping thresholds of the second cell, in case of determining that the second cell is to serve as the candidate cell for the cell reselection of the terminal; and access the second cell, based on an uplink resource corresponding to the camping threshold.

Optionally, in the case that the terminal performs a cell reselection, the terminal further includes a fourth processor configured to:

calculate at least two camping threshold values of the second cell respectively, based on the one camping threshold and the at least two threshold offsets of the second cell;

determine whether the second cell is to serve as a candidate cell for the cell reselection of the terminal, based on the uplink resource access capability of the terminal and the at least two calculated camping threshold values of the second cell;

select the camping threshold corresponding to the uplink resource access capability of the terminal from the at least two camping threshold values of the second cell, in case of determining that the second cell is to serve as the candidate cell for the cell reselection of the terminal; and access the second cell, based on an uplink resource corresponding to the camping threshold.

A communication device is further provided in an embodiment of the present disclosure, including a processor and a memory storing a computer program, where the computer program is executed by the processor to perform the method hereinabove. The communication device may be a network device, such as a base station or a terminal. In the case that the communication device is a base station, the processor executes the computer program to perform the method in the above embodiment. In the case that the communication device is a terminal, the processor executes the computer program to perform the method in the above embodiment. The memory and the processor herein may be connected through a bus or an interface.

A computer-readable storage medium is further provided in an embodiment of the present disclosure, including an instruction, where the instruction runs on a computer to enable the computer to perform the method hereinabove.

The above are some embodiments of the present disclosure. It should be noted that, for those of ordinary skill in the art, without departing from the principle in the present disclosure, several improvements and modifications may be made. These improvements and modifications should be considered as the scope of the present disclosure.

What is claimed is:

1. A method of sending cell information, applied to a 5G new radio (NR) and comprising:

sending system information of a first cell to a terminal, wherein the system information comprises at least two camping thresholds of the first cell, or one camping threshold and at least two threshold offsets of the first cell;

the at least two camping thresholds respectively correspond to terminals with different uplink resource access capabilities, and the at least two threshold offsets respectively correspond to terminals with different uplink resource access capabilities;

wherein the system information further comprises: at least two camping thresholds of a second cell, or one camping threshold and at least two threshold offsets of the second cell;

the second cell is a neighboring cell of the first cell;

the at least two camping thresholds of the second cell respectively correspond to terminals with different uplink resource access capabilities, and the at least two threshold offsets of the second cell respectively correspond to terminals with different uplink resource access capabilities; and wherein the at least two camping thresholds of the second cell, or the one camping threshold and the at least two threshold offsets of the second cell are added to the system information of the first cell.

2. The method according to claim 1, wherein the sending the system information of the first cell to the terminal comprises:

sending, by the first cell supporting a supplementary uplink resource technology, the system information of the first cell to the terminal.

3. The cell camping method according to claim 1, wherein in the case that the terminal performs a cell reselection, the method further comprises:

determining whether the second cell is to serve as a candidate cell for the cell reselection of the terminal, based on the uplink resource access capability of the terminal and the at least two camping thresholds of the second cell;

selecting the camping threshold corresponding to the uplink resource access capability of the terminal from the at least two camping thresholds of the second cell, in case of determining that the second cell is to serve as the candidate cell for the cell reselection of the terminal; and accessing the second cell, based on an uplink resource corresponding to the camping threshold.

4. The cell camping method according to claim 1, wherein in the case that the terminal performs a cell reselection, the method further comprises:

calculating at least two camping threshold values of the second cell respectively, based on the one camping threshold and the at least two threshold offsets of the second cell;

determining whether the second cell is to serve as a candidate cell for the cell reselection of the terminal, based on the uplink resource access capability of the terminal and the at least two calculated camping threshold values of the second cell;

selecting the camping threshold corresponding to the uplink resource access capability of the terminal from the at least two camping threshold values of the second cell, in case of determining that the second cell is to serve as the candidate cell for the cell reselection of the terminal; and accessing the second cell, based on an uplink resource corresponding to the camping threshold.

5. A communication device, comprising a processor and a memory storing a computer program, wherein the computer program is executed by the processor to perform the method of sending cell information according to claim 1.

6. A non-transitory computer-readable storage medium, comprising an instruction, wherein the instruction runs on a computer to enable the computer to perform the method of sending cell information according to claim 1.

7. A network device, applied to a 5G new radio (NR) and comprising: a transceiver configured to send system information of a first cell to a terminal, wherein
  the system information comprises at least two camping thresholds of the first cell, or one camping threshold and at least two threshold offsets of the first cell;
  the at least two camping thresholds respectively correspond to terminals with different uplink resource access capabilities, and the at least two threshold offsets respectively correspond to terminals with different uplink resource access capabilities;
  wherein the system information further comprises: at least two camping thresholds of a second cell, or one camping threshold and at least two threshold offsets of the second cell;
  the second cell is a neighboring cell of the first cell;
  the at least two camping thresholds of the second cell respectively correspond to terminals with different uplink resource access capabilities, and the at least two threshold offsets of the second cell respectively correspond to terminals with different uplink resource access capabilities; and
  wherein the at least two camping thresholds of the second cell, or the one camping threshold and the at least two threshold offsets of the second cell are added to the system information of the first cell.

8. A cell camping method, applied to a 5G new radio (NR) and comprising:
  receiving system information of a first cell sent by the first cell, wherein
  the system information comprises at least two camping thresholds of the first cell, or one camping threshold and at least two threshold offsets of the first cell;
  the at least two camping thresholds respectively correspond to terminals with different uplink resource access capabilities, and the at least two threshold offsets respectively correspond to terminals with different uplink resource access capabilities;
  wherein the system information further comprises: at least two camping thresholds of a second cell, or one camping threshold and at least two threshold offsets of the second cell;
  the second cell is a neighboring cell of the first cell;
  the at least two camping thresholds of the second cell respectively correspond to terminals with different uplink resource access capabilities, and the at least two threshold offsets of the second cell respectively correspond to terminals with different uplink resource access capabilities; and
  wherein the at least two camping thresholds of the second cell, or the one camping threshold and the at least two threshold offsets of the second cell are added to the system information of the first cell.

9. The cell camping method according to claim 8, wherein the receiving the system information of the first cell sent by the first cell comprises:
  receiving the system information sent by the first cell supporting an uplink supplementary resource technology.

10. The cell camping method according to claim 8, further comprising:
  selecting, based on the uplink resource access capability of the terminal, the camping threshold corresponding to the uplink resource access capability of the terminal from the at least two camping thresholds;
  accessing and camping on the first cell, based on an uplink resource corresponding to the camping threshold.

11. The cell camping method according to claim 8, further comprising:
  calculating at least two camping threshold values respectively based on the one camping threshold and the at least two threshold offsets;
  selecting, based on the uplink resource access capability of the terminal, the camping threshold corresponding to the uplink resource access capability of the terminal from the at least two calculated camping threshold values; and
  accessing and camping on the first cell, based on an uplink resource corresponding to the camping threshold corresponding to the uplink resource access capability of the terminal.

12. A terminal, comprising: a transceiver configured to perform the cell camping method according to claim 6.

13. The terminal according to claim 12, wherein the transceiver is further configured to receive the system information sent by the first cell supporting an uplink supplementary resource technology.

14. The terminal according to claim 12, further comprising a first processor configured to:
  select, based on the uplink resource access capability of the terminal, the camping threshold corresponding to the uplink resource access capability of the terminal from the at least two camping thresholds;
  access and camp on the first cell, based on an uplink resource corresponding to the camping threshold.

15. The terminal according to claim 12, further comprising a second processor configured to:
  calculate at least two camping threshold values respectively based on the one camping threshold and the at least two threshold offsets;
  select, based on the uplink resource access capability of the terminal, the camping threshold corresponding to the uplink resource access capability of the terminal from the at least two calculated camping threshold values; and
  access and camp on the first cell, based on an uplink resource corresponding to the camping threshold corresponding to the uplink resource access capability of the terminal.

16. The terminal according to claim 12, wherein in the case that the terminal performs a cell reselection, the terminal further comprises a third processor configured to:
  determine whether the second cell is to serve as a candidate cell for the cell reselection of the terminal, based on the uplink resource access capability of the terminal and the at least two camping thresholds of the second cell;
  select the camping threshold corresponding to the uplink resource access capability of the terminal from the at least two camping thresholds of the second cell, in case of determining that the second cell is to serve as the candidate cell for the cell reselection of the terminal; and
  access the second cell, based on an uplink resource corresponding to the camping threshold.

17. The terminal according to claim 12, wherein in the case that the terminal performs a cell reselection, the terminal further comprises a fourth processor configured to:

calculate at least two camping threshold values of the second cell respectively, based on the one camping threshold and the at least two threshold offsets of the second cell;
determine whether the second cell is to serve as a candidate cell for the cell reselection of the terminal, based on the uplink resource access capability of the terminal and the at least two calculated camping threshold values of the second cell;
select the camping threshold corresponding to the uplink resource access capability of the terminal from the at least two camping threshold values of the second cell, in case of determining that the second cell is to serve as the candidate cell for the cell reselection of the terminal; and
access the second cell, based on an uplink resource corresponding to the camping threshold.

* * * * *